United States Patent
Carlstrom, Jr. et al.

(10) Patent No.: US 7,090,939 B2
(45) Date of Patent: Aug. 15, 2006

(54) FORMING A LAYER ON A FLOW PLATE OF A FUEL CELL STACK

(75) Inventors: Charles Michael Carlstrom, Jr., Saratoga Springs, NY (US); John G. Piccirillo, Schenectady, NY (US); Dustan L. Skidmore, Latham, NY (US)

(73) Assignee: Plug Power Inc., Latham, NY (US)

( * ) Notice: Subject to any disclaimer, the term of this patent is extended or adjusted under 35 U.S.C. 154(b) by 374 days.

(21) Appl. No.: 10/402,531

(22) Filed: Mar. 28, 2003

(65) Prior Publication Data

US 2004/0191582 A1 Sep. 30, 2004

(51) Int. Cl.
*H01M 8/02* (2006.01)
*B05D 5/12* (2006.01)
*C05D 5/00* (2006.01)
*C05D 5/10* (2006.01)
*C05D 9/00* (2006.01)

(52) U.S. Cl. .......................... 429/12; 429/13; 429/38; 427/115; 205/80; 205/170; 205/316

(58) Field of Classification Search ................ 429/12, 429/13, 26, 38, 39; 427/115; 205/80, 111, 205/114, 170, 316, 317
See application file for complete search history.

(56) References Cited

U.S. PATENT DOCUMENTS

| | | | | |
|---|---|---|---|---|
| 4,945,010 A | * | 7/1990 | Kaufman et al. | 429/26 |
| 6,533,827 B1 | * | 3/2003 | Cisar et al. | 427/115 X |
| 6,699,593 B1 | * | 3/2004 | Kaneta et al. | 205/222 |
| 6,730,363 B1 | * | 5/2004 | Shah et al. | 427/115 X |
| 6,773,841 B1 | * | 8/2004 | Rapaport et al. | 429/26 |
| 2002/0050458 A1 | * | 5/2002 | Matsukawa et al. | 427/115 X |

* cited by examiner

*Primary Examiner*—Stephen J. Kalafut
(74) *Attorney, Agent, or Firm*—Trop, Pruner & Hu, P.C.

(57) ABSTRACT

A technique includes applying a charge to a flow plate of a fuel cell stack and depositing a material on at least a portion of the flow plate in response to the charge. In some embodiments of the invention, the technique may be applied to a fuel cell stack that includes a passageway to communicate a coolant. As a result of the technique, the fuel cell stack may include a layer to line the passageway to electrically insulate the stack from the coolant.

34 Claims, 7 Drawing Sheets

FORMING A LAYER ON A FLOW PLATE OF A FUEL CELL STACK

BACKGROUND

The invention generally relates to forming a layer on a flow plate of a fuel cell stack.

A fuel cell is an electrochemical device that converts chemical energy that is produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following relationships:

$$H_2 \rightarrow 2H^+ + 2e^- \quad \text{Eq. 1}$$

at the anode of the cell, and $$O_2 + 4H^+ + 4e^- \rightarrow 2H_2O \quad \text{Eq. 2}$$

at the cathode of the cell.

A typical fuel cell has a terminal voltage near one volt DC. For purposes of producing much larger voltages, several fuel cells may be assembled together to form a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal flow plates, as examples) that are stacked one on top of the other, and each flow plate may be associated with more than one fuel cell of the stack. The flow plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The electrochemical reactions inside the fuel cell stack produce heat that must be removed from the stack. Thus, a coolant may be circulated through the stack to absorb thermal energy from the stack and carry this thermal energy away from the stack. There are a wide variety of potential coolants available. However, the coolants that may be used depend on various properties of the fuel cell stack.

Thus, there exists a continuing need for an arrangement and/or technique to expand the different types of coolants that may be used in connection with the operation of a fuel cell stack.

SUMMARY

In an embodiment of the invention, a technique includes applying a charge to a flow plate of a fuel cell stack and depositing a material on at least a portion of the flow plate in response to the charge.

In another embodiment of the invention, a fuel cell stack includes a passageway to communicate a coolant. The fuel cell stack also includes a layer to line the passageway to electrically insulate the stack from the coolant.

Advantages and other features of the invention will become apparent from the following description, drawing and claims.

DETAILED DESCRIPTION

Figure 1:
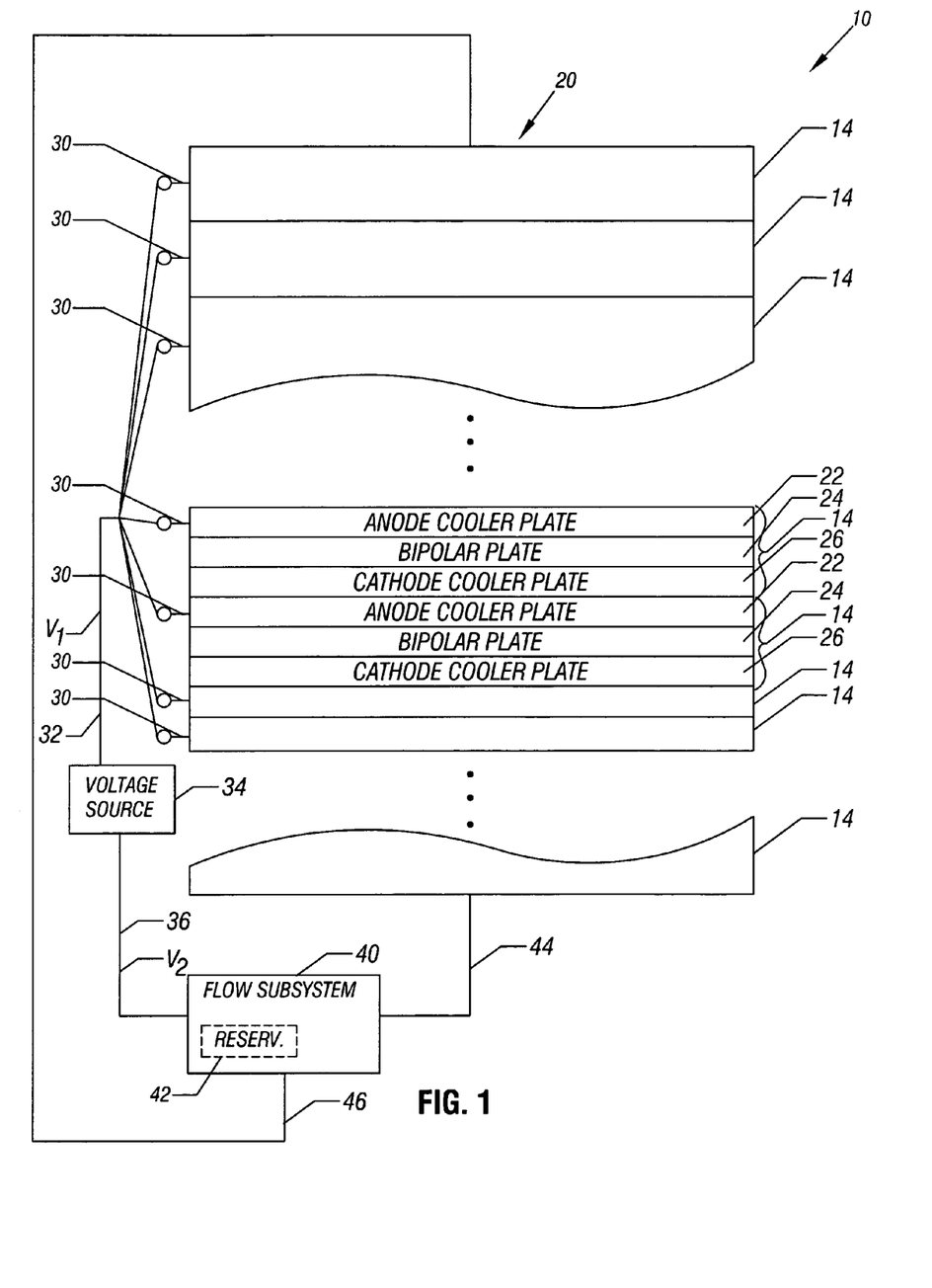
FIG. 1 is a schematic of a system to form a layer of electrically insulative material that lines coolant passageways of flow plates of a fuel cell stack according to an embodiment of the invention.

Referring to FIG. 1, an embodiment of a system 10 in accordance with the invention may be used to form an electrically insulating layer that coats, or lines, the coolant passageways of a fuel cell stack 20 for purposes of electrically insulating flow plates of the stack 20 from a coolant that flows through the coolant passageways. Due to this insulating layer, an electrically conductive coolant may be used to remove thermal energy from the fuel cell stack 20 during the normal operation (i.e., the power producing operation of the fuel cell stack 20) of the stack 20, thereby expanding the number of possible coolants formulations that may be used in connection with the normal operation of the stack 20.

In some embodiments of the invention, the coolant passageways are formed by the flow plates of the fuel cell stack 20. Thus, before the discussion of the technique and system that are used to coat the coolant passageways of the fuel cell stack 20, a discussion of a possible embodiment of the stack 20 is described below for purposes of clarifying how these coolant passageways are formed in the stack 20. In some embodiments of the invention, the fuel cell stack 20 is formed from stacked of repeating units 14, each of which forms an upper fuel cell and a lower fuel cell (described below). Each unit 14 includes a set of electrically conductive flow plates (graphite composite or metal flow plates, as examples) and includes an electrical output terminal 30. The terminal 30 provides the anode voltage of the upper fuel cell of one unit 14 and the cathode voltage of the lower fuel cell of the next higher unit 14 in the fuel cell stack 20 during the normal operation of the stack 20.

The unit 14 may include three flow plates: a cathode cooler flow plate 26, a bi-polar flow plate 24 and an anode cooler flow plate 22 that are stacked from bottom to top in the listed order. Each cooler flow plate 22, 26 functions as a heat exchanger by routing a coolant through flow channels in either the upper or lower surface of the cooler flow plate 22, 26 to remove heat from the fuel cell stack 20. The cooler flow plate surface that is not used to route the coolant includes flow channels to route either fuel (for the anode cooler flow plate 22) or oxidant (for the cathode cooler flow plate 26) to an associated fuel cell. The bipolar flow plate 24 includes flow channels on its upper surface to route fuel to the associated lower fuel cell and flow channels on the opposing lower surface to route oxidant to the other associated fuel cell. Due to this arrangement, each fuel cell is formed in part from one bipolar flow plate 24 and one cooler flow plate 22, 26.

For example, the upper fuel cell of the unit 14 may include an anode-membrane-cathode sandwich (called a membrane-electrode-assembly (MEA)) that is located between the anode cooler flow plate 22 and the bipolar flow plate 24. In this manner, the upper surface of the bipolar flow plate 24 includes flow channels to route oxidant near the cathode of the MEA, and the lower surface of the anode cooler flow plate 24 includes flow channels to route fuel (hydrogen) near the anode of the MEA.

As another example, the lower fuel cell of the unit 14 may be formed from another MEA that is located between the bipolar flow plate 24 and the cathode cooler flow plate 26. In this manner, the lower surface of the bipolar flow plate 24 includes flow channels to route fuel near the anode of the MEA, and the upper surface of the cathode cooler flow plate 26 includes flow channels to route oxidant near the cathode of the MEA. The other fuel cells of the fuel cell stack 20 are formed in a similar manner.

In some embodiments of the invention, the coolant passageways of the fuel cell stack 20 are formed between adjacent anode 22 and cathode 26 cooler flow plates. In this manner, coolant passageways are formed between each pair of adjacent units 14 due to the alignment of the coolant flow channels of the corresponding anode 22 and cathode 26 cooler flow plates.

Figure 3:
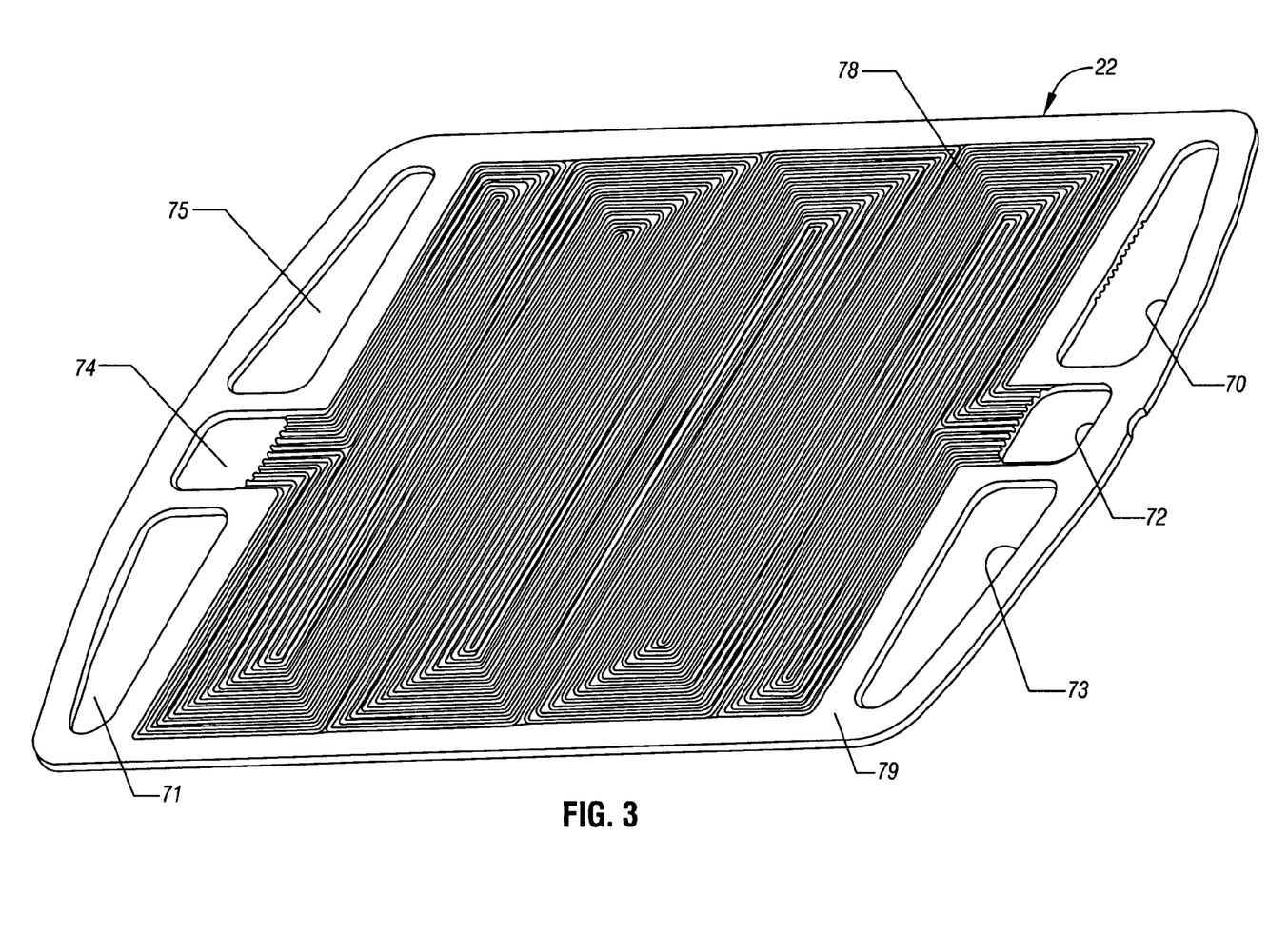
FIG. 3 is a schematic diagram of an anode cooler flow plate according to an embodiment of the invention.

As an example, FIG. 3 depicts an embodiment of the anode cooler flow plate 22, although the anode cooler flow plate 22 may take on a different form in other embodiments of the invention. As shown, the anode cooler flow plate 22 includes an upper surface 79 in which are formed flow channels 78 that each generally have a U-shaped cross-section. These flow channels 78 of the anode cooler flow plate 22 form the bottom half of the coolant passageways between the anode cooler flow plate 22 and the adjacent upper cathode cooler flow plate 26. In this manner, the upper half of the coolant passageways are formed from the corresponding coolant flow channels (not shown) that are formed on the lower surface of the adjacent cathode cooler flow plate 26.

For purpose of communicating coolant through the coolant passageways, the anode cooler flow plate 22 includes an opening 72 that forms part of a manifold passageway (in combination with the other flow plates) for communicating coolant into the coolant flow passageways of the fuel cell stack 20. The anode cooler flow plate 22 also includes an opening 74 that forms part of a manifold passageway (in combination with the other flow plates) for communicating coolant out of the fuel cell stack 20. The cathode cooler plate 26 has similar features for communicating coolant in and out of its flow channels.

The anode cooler flow plate 22 has features similar to the other flow plates of the fuel cell stack 20, such as, for example, an opening 70 that forms part of a manifold passageway (in combination with the other flow plates) for communicating fuel into the fuel cell stack 20 and an opening 71 that forms part of a manifold passageway (in combination with the other flow plates) for communicating unconsumed fuel from the stack 20. The anode cooler flow plate 22 also includes an opening 73 that forms part of a manifold passageway (in combination with the other flow plates) for communicating oxidant into the fuel cell stack 20 and an opening 75 that forms part of a manifold passageway (in combination with the other flow plates) for communicating unconsumed oxidant from the stack 20.

Thus, the coolant passageways of the fuel cell stack 20 are form by the flow channels of the anode 22 and cathode 26 cooler plates and are formed by manifold passageways (of the fuel cell stack 20) that communicate coolant. In short, any fuel cell stack passageway that communicates coolant is considered a "coolant passageway" in the context of this application. The flow plates of the fuel cell stack 20 form some if not all of the coolant passageways of the stack 20, depending on the particular embodiment of the invention.

Referring to back to FIG. 1, for purposes of forming the electrically insulating coating that lines the coolant passageways of the fuel cell stack 20, a dielectric electrocoating material is used, in some embodiments of the invention. As an example, this electrocoating material may be an acrylic-based or an epoxy-based material. As its name implies, the electrocoating material is applied by creating an electrical potential (i.e., a voltage) between the surfaces to be coated and the electrocoating material. In response to this potential, a current is created between the electrocoating material and these surfaces. This current, in turn, forms a deposited layer on the surface. During the electrocoating process, the thickness of the deposited layer uniformly increases over the surface until the thickness causes the layer to become an electrically insulating, or dielectric layer. At this point, the current drops off, the thickness does not increase and a uniform insulating layer has been formed.

Thus, the electrocoating material is deposited on the surfaces that form the coolant passageways by 1.) creating a potential between the flow plates of the stack and the electrocoating material; and 2.) circulating the electrocoating material through the coolant passageways to deposit the layer to line the coolant passageways. The thickness of the layer is a function of the potential created between the electrocoating material and the surface onto which the material is deposited.

Figure 4:
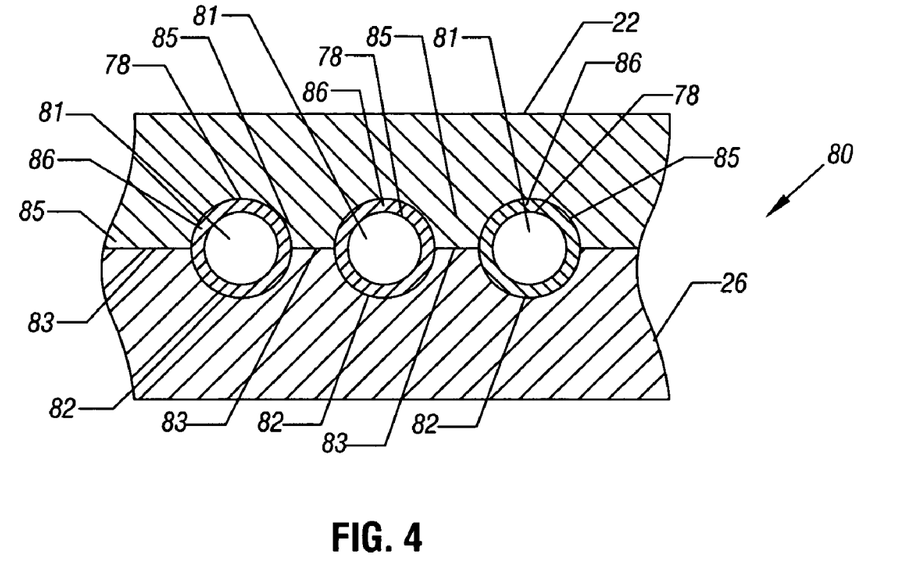
FIGS. 4 and 7 are cross-sectional views of portions of the fuel cell stack according to different embodiments of the invention.

As an example of the product that is formed, FIG. 4 depicts an exemplary cross-section 80 of a portion of an adjacent anode cooler flow plate 22 and a cathode cooler flow plate 26 after the electrocoating. The cross-section 80 depicted includes flow channels 78 of the anode cooler flow plate 22. Each adjacent pair of flow channels 78 of the anode cooler flow plate 22 is separated by a land 85. The cathode cooler plate 26 also includes flow channels 82, and each adjacent pair of flow channels 82 is separated by a land 83.

FIG. 4 depicts the exact alignment of the flow channels 78 of the anode cooler plate 22 and the flow channels 82 of the cathode cooler plate 26 to form coolant passageways 81, each of which generally has a circular cross-section. Thus, with the depicted alignment of the flow channels 78 and 82, the lands 83 and 85 contact each other. Due to the electrical conductivity of the anode 22 and cathode 26 cooler flow plates, electrical connections are established between the plates 22 and 26 to electrically connect two adjacent fuel cells together. As shown in FIG. 4, each coolant passageway 81 is coated, or lined, with a layer 86 of the deposited electrocoating material. Thus, as can be seen, any coolant that passes through the coolant passageways 81 is isolated from the surrounding conductive surfaces of the anode 22 and cathode 26 cooler flow plates.

In some fuel cell stacks, the anode 22 and cathode 26 cooler flow plates may not align exactly as depicted in FIG. 4. Instead, a slight misalignment may occur, as depicted in an exemplary cross-section 250 in FIG. 7. Due to this misalignment, lands 83 and 85 partially overlap the flow channels 78 and 82, respectively. However, the technique used to deposit the electrocoating material ensures that a layer 86 still lines each coolant passageway 81 even if the coolant passageway 81 does not have an exact circular cross-section.

Figure 7:
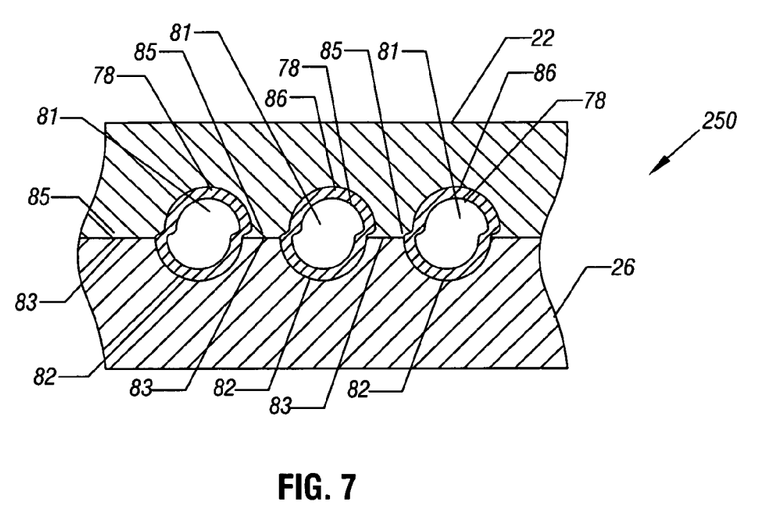

In some embodiments of the invention, the flow channels 78 and 82 may be coated with an electrically insulating layer before the assembly of the stack 20, leaving the lands 83 and 85 exposed. Thus, ideally, the flow channels 78 and 82 should align to form the coolant passageways 81, and the lands 83 and 85 should contact each other to form the electrical connections between the anode cooler 22 and cathode cooler 26 plates. However, should a misalignment occur, such as the misalignment that is depicted in FIG. 7, a portion of the uncoated lands 83 and 85 would extend into the coolant passageways 81, thereby exposing the electrically conductive flow plates to coolant that passes through the coolant passageways 81. Furthermore, due to this misalignment, the electrically insulating coating would degrade the integrity of the electrical connections formed between the anode 22 and cathode 26 cooler flow plates.

Therefore, forming the layer 86 after the assembly of the fuel cell stack 20 provides the advantage of tolerating a misalignment between the anode 22 and cathode 26 cooler flow plates, as the layer 86 forms on all conductive flow plate surfaces (inside the coolant passageways 81) that are exposed to the electrocoating material during the electrocoating process, regardless of whether these surfaces are land surfaces or channel surfaces.

Referring back to FIG. 1, in some embodiments of the invention, the system 10 includes a flow subsystem 40 for purposes of circulating the electrocoating material in its fluid state through the coolant passageways of the fuel cell stack 20. In this manner, the flow subsystem 40 includes a reservoir 42 that stores the electrocoating material (in its undeposited fluid state) and includes various pumps and valves (not shown) that circulate the electrocoating material through the coolant passageways of the fuel cell stack 20. The flow subsystem 40 has an output port that is connected to a fluid communication conduit 44 that, in turn, is connected to a coolant inlet manifold opening of the fuel cell stack 20; and the flow subsystem 40 also includes an inlet port that is connected to a fluid communication conduit 46 that, in turn, is coupled to the coolant outlet manifold of the fuel cell stack 20.

For purposes of applying the appropriate potential between the fuel cell stack 20 and the electrocoating material, the system 10 includes a voltage source 34 that (via an electrical communication line 36) furnishes a voltage (called "$V_2$") for purposes of establishing a predetermined potential on the electrocoating fluid. As an example, the "$V_2$" voltage may be ground. However, the $V_2$ voltage may be another voltage, in other embodiments of the invention. In some embodiments of the invention, the electrical communication line 36 is electrically coupled to the reservoir 42 so that the electrocoating material assumes the potential that is established by the $V_2$ voltage. In some embodiments of the invention, the electrical communication line 36 may be coupled to either or both of the fluid communication conduits 44 and 46. Other electrical connections may be made in other embodiments of the invention for purposes of establishing a predetermined potential on the electrocoating material.

For purposes of establishing a potential on the flow plates, in some embodiments of the invention, the voltage source 34 furnishes (via an electrical communication line 32) a voltage (called "$V_1$") to the flow plates of the fuel cell stack 20. As an example, the "$V_1$" voltage may be a positive or a negative voltage but is different from the $V_2$ voltage to establish a potential difference between the flow plates of the fuel cell stack 20 and the electrocoating material. To accomplish this, in some embodiments of the invention, all of the output terminals 30 of the fuel cell stack 20 may be electrically coupled to the electrical communication line 32. In this manner, in the normal operation of the fuel cell stack 20, the terminals 30 serve as output terminals. However, in the electrocoating technique described herein, the terminals 30 are used to establish the same potential on all of the flow plates of the fuel cell stack 20 to create the desired potential difference between the flow plates and the electrocoating material.

Thus, due to this arrangement, the flow subsystem 40 may be used to circulate the electrocoating material (in its undeposited fluid state) through the coolant passageways of the fuel cell stack 20, and the potential difference that is established by the voltage source 34 causes the depositing of the electrocoating material onto the corresponding coolant passageways.

Figure 2:
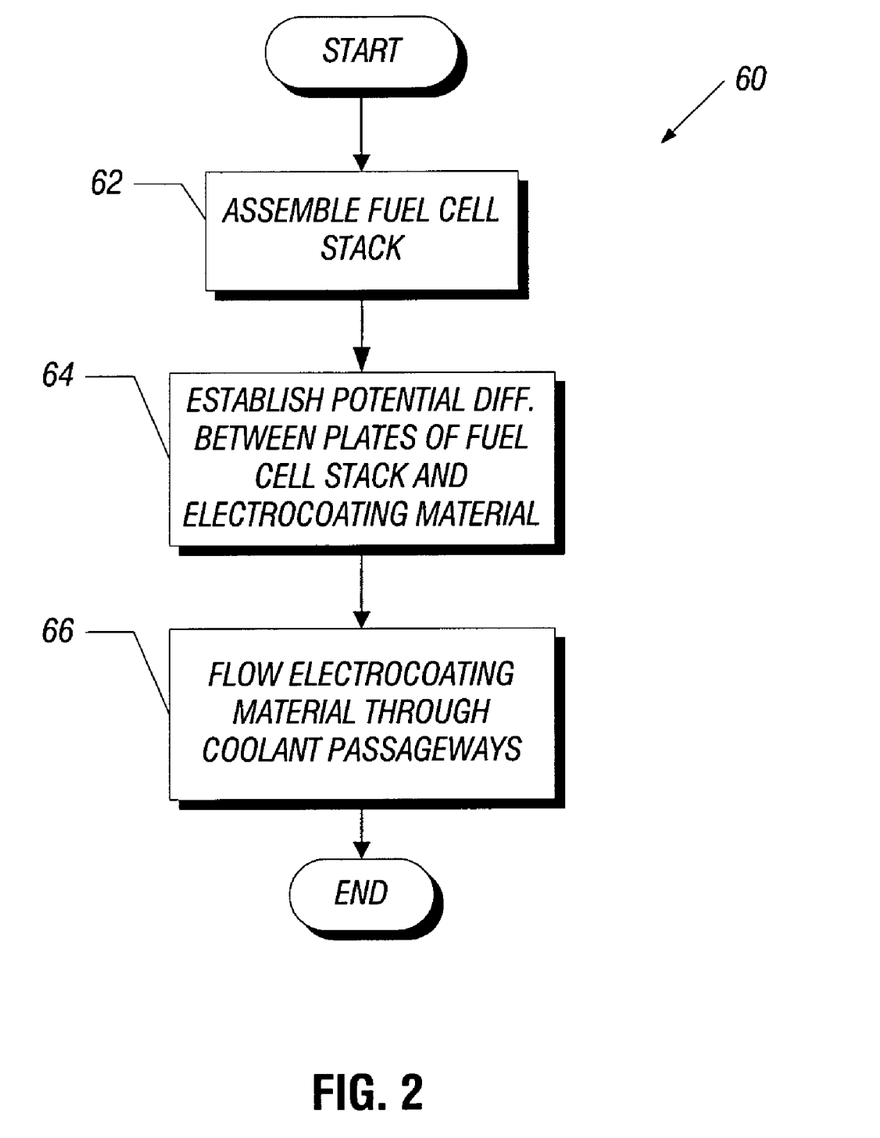
FIGS. 2 and 6 are flow diagrams depicting techniques to form the layer of electrically insulating material according to different embodiments of the invention.

Referring to FIG. 2, to summarize, in some embodiments of the invention, a technique 60 may be used to electrically insulate the coolant passageways of the fuel cell stack 20 from coolant that flows therethrough. In this manner, the technique 60 includes assembling (block 62) the fuel cell stack 20. This assembly includes assembly of the flow plates, gaskets, MEAs, etc. Next, with the assembled fuel cell stack 20, a potential difference is established (block 64) between the flow plates of the fuel cell stack 20 and on the electrocoating material. While the potential difference is established, the electrocoating fluid is flowed (block 66) through the coolant passageways. The electrocoating fluid, in turn, forms a deposit in the coolant channels to, in turn, line the coolant passageways and form the electrically insulating layer. Thus, on completion of the technique 60, the fuel cell stack 20 is prepared to communicate an electrically conductive coolant fluid through its coolant passageways.

Figure 5:
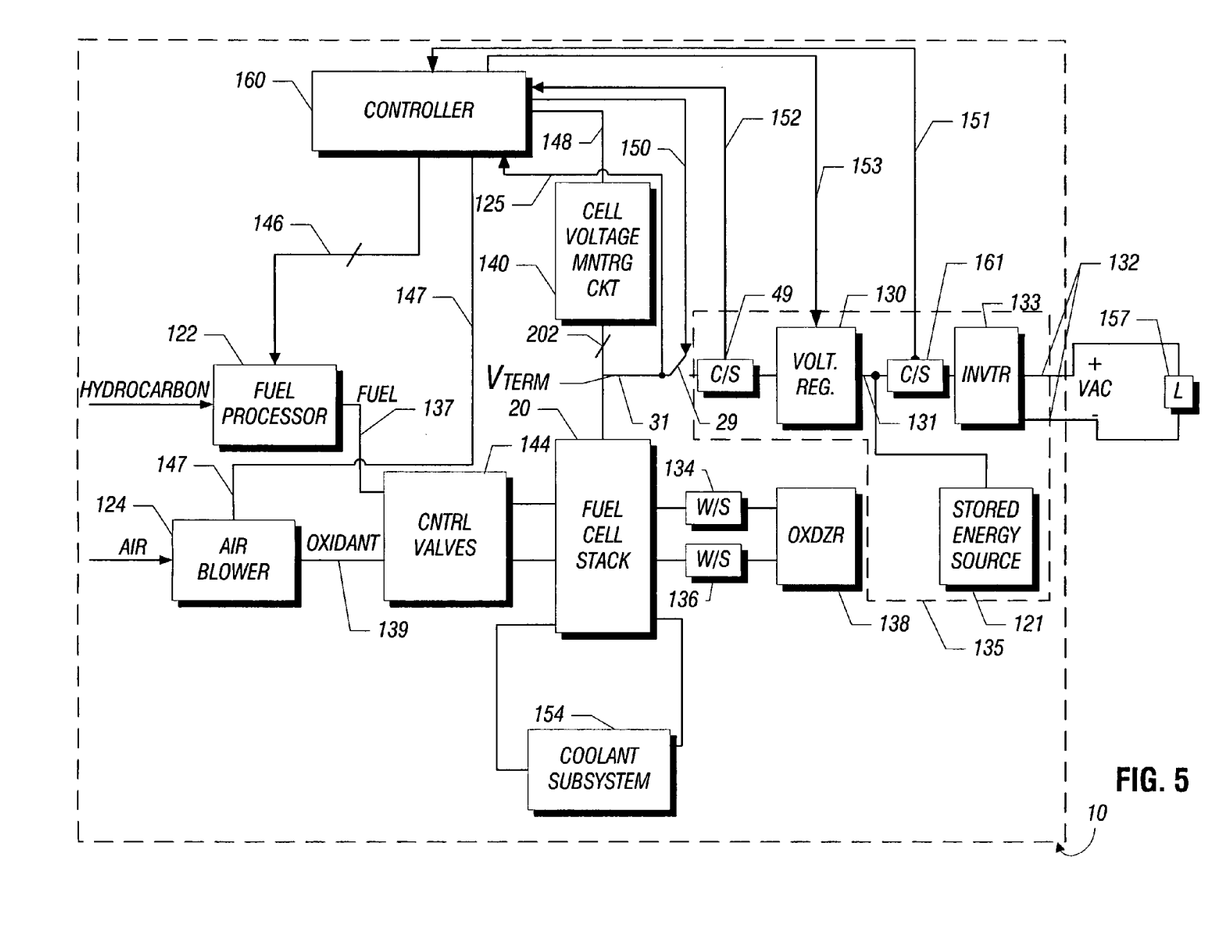
FIG. 5 is a schematic diagram of a fuel cell system according to an embodiment of the invention.

Referring to FIG. 5, in some embodiments of the invention, the fuel cell stack 20 may be used in a fuel cell system 110. In this manner, the fuel cell stack 20 produces power for a load 157 (a residential load, for example) in response to fuel and oxidant (i.e., reactant) flows that are provided by a fuel processor 122 (a reformer, for example) and an air blower 124, respectively. The fuel cell system 110 controls (via a controller 160) the fuel production of the fuel processor 122 to control the fuel flow that the processor 122 provides to the fuel cell stack 20. This rate of fuel flow to the fuel cell stack 20, in turn, controls the level of power that is produced by the stack 20. The fuel cell system 110 also controls the air flow from the air blower 124 to regulate the appropriate stoichiometric ratio (see Eqs. 1 and 2) of reactants flowing to the fuel cell stack 20.

In some embodiments of the invention, the fuel cell system 110 includes power conditioning circuitry 135 that includes a DC-to-DC voltage regulator 130, a stored energy source 121 (a battery, for example) and an inverter 133. The voltage regulator 130 is coupled to the output terminals 30 of the fuel cell stack 20 to receive a $V_{TERM}$ stack voltage. The voltage regulator 130 converts the $V_{TERM}$ stack voltage into a regulated output voltage that appears on an output terminal 131 of the regulator 130. The voltage regulator 130 may be controlled by the controller 160 via electrical communication lines 153. The stored energy source 121 is coupled to the output terminal 131 of the regulator 130. An input terminal of a DC-to-AC inverter 133 is coupled to the output terminal 131. The inverter 133 converts the DC voltage that appears on the output terminal 131 into a regulated $V_{AC}$ voltage that is furnished across output terminals 132 of the inverter 133 to the load 157.

Among the other features of the fuel cell system 110, the system 110 may include a cell voltage monitoring circuit 140 that provides indications of individual cell voltages to the controller 160 via a serial bus 148. The fuel cell system 110 may also include a switch 129 that is controlled by the controller 160 (via a communication line 150) for purposes of isolating the fuel cell stack 20 from the power conditioning circuitry 135 in response to a shut down of the fuel cell stack 20. The fuel cell system 110 may also include control valves 144 that provide emergency shutoff of the oxidant and fuel flows to the fuel cell stack 20. The control valves 144 are coupled between inlet fuel 137 and oxidant 139 lines and the fuel and oxidant manifold inlets, respectively, to the fuel cell stack 20. The inlet fuel line 137 receives the fuel flow from the fuel processor 122, and the inlet oxidant line 139 receives the oxidant flow from the air blower 124. The fuel processor 122 receives a hydrocarbon (natural gas or propane, as examples) and converts this hydrocarbon into the fuel flow (a hydrogen flow, for example) that is provided to the fuel cell stack 20.

The fuel cell system 110 may include water separators, such as water separators 134 and 136, to recover water from the outlet and/or inlet fuel and oxidant ports of the stack 20. The water that is collected by the water separators 134 and 136 may be routed to a water collection tank (not shown) for possible reuse. A coolant subsystem 154 of the fuel cell system 110 circulates a coolant through the coolant passageways of the fuel cell stack 20 to regulate the operating temperature of the stack 20. Due to the electrically insulating layer that lines the coolant passageways of the fuel cell stack 20, the coolant may be an electrically conductive coolant. The fuel cell system 110 may also include an oxidizer 138, or flare, to burn any unconsumed fuel (from the stack 20) that is not consumed in the fuel cell reactions.

The fuel cell system 110 includes various sensors to communicate the status of various states to the controller 160. For example, in some embodiments of the invention, the fuel cell system 110 may include a current sensor 149 that is coupled in series with an input terminal of the voltage regulator 130. In this manner, the controller 160 may use the current sensor 149 to sense (via an electrical communication line 152) the output current from the fuel cell stack 20. The fuel cell system 110 may also include, for example, a current sensor 161 that is coupled in series with an input terminal of the inverter 133. In this manner, the controller 160 may use the current sensor 161 to sense (via an electrical communication line 151) the input current to the inverter 133 and thus, determine an indication of the output current for the fuel cell system 110. The controller 160 may sense various other parameters of the fuel cell system 110, such as, for example, the $V_{TERM}$ voltage via an electrical communication line 125. Various other arrangements are possible.

In some embodiments of the invention, the controller 160 may include a microcontroller and/or a microprocessor to perform functions associated with controlling the fuel cell system 110. Various analog and digital external pins of the microcontroller may be used to establish communication over the electrical communication lines, such as electrical communication lines 125, 146, 147, 150, 151, 152 and 153 and the serial bus 148. Electrical interferences (not shown) may be coupled between these communication lines and the controller 160. Other variations are possible.

Other embodiments are within the scope of the following claims. For example, in some embodiments of the invention, the coating that is deposited on the stack may be electrically conductive. In this manner, the electrically conductive coating may be used in anode and/or cathode regions of flow plates to decrease the electrical resistance between adjacent flow plates.

Figure 6:
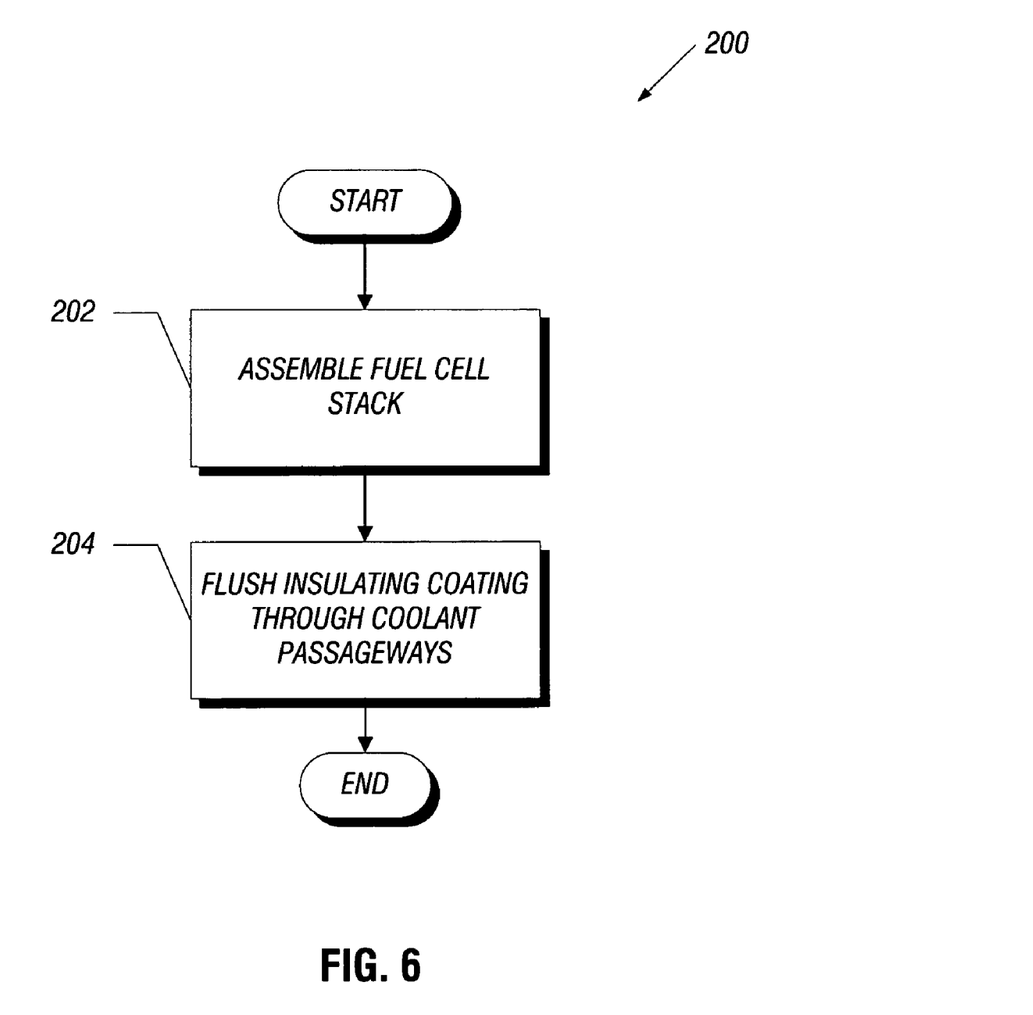

As another example of another embodiment of the invention, referring to FIG. 6, an alternative technique 200 may be used to electrically isolate the flow plates from the coolant. In this manner, the technique 200 includes assembling (block 202) the fuel cell stack. Subsequently, the technique 200 includes flushing (block 204) an insulating coating through the coolant passageways. Unlike the electrocoating material, the insulating coating does not require charges to be placed on the stack 20 and on the coating fluid to accomplish the depositing of this material onto the flow channels of the anode 22 and cathode 26 cooler flow plates. Instead the fluid inside the coolant passageways is allowed to dry to form an electrically insulating layer. The insulating coating material may be an acrylic-based or an epoxy-based material, as just a few examples. The technique 200 may alternatively be used, in some embodiments of the invention, to deposit a coating that is electrically conductive.

In some embodiments of the invention, more than one layer, or coating, may be formed on the fuel cell stack. For example, in some embodiments of the invention, the techniques that are described herein may be used to form dielectric and electrically conductive layers on parts of the fuel cell stack. As a more specific example, in some embodiments of the invention, the techniques that are described herein may be used to deposit an electrically conductive coating on the entire (for example) flow plate. In this regard, the electrically conductive coating may be formed on each flow plate before the flow plate is assembled into the stack. This electrically conductive coating aids in improving the electrical connections between the anode/cathode regions of the stack. Next, the stack is assembled, and subsequently, the techniques that are described herein may be used to selectively form a dielectric coating in certain regions (coolant passageways, for example) of the stack. In these regions, the dielectric coating covers the electrically conductive coating. Alternatively, in some embodiments of the invention, the dielectric coating may be formed first, and the electrically conductive coating may be formed afterward. Other variations are possible.

In the preceding description, directional terms, such as "upper," "lower," "vertical," "horizontal," etc. may have been used for reasons of convenience to describe the fuel cell stack, the various systems and their associated components. However, such orientations are not needed to practice the invention, and thus, other orientations are possible in other embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   applying a charge to a flow plate of a fuel cell stack; and
   depositing a dielectric material on at least a portion of the flow plate in response to the charge, the depositing comprising flowing the dielectric material through the fuel cell stack.

2. The method of claim 1, further comprising:
using the deposited dielectric material to insulate at least part of the fuel cell stack from a coolant flowing through the fuel cell stack.

3. The method of claim 1, wherein the depositing comprises:
depositing the material to line coolant passageways of the fuel cell stack.

4. The method of claim 1, further comprising:
forming a first layer on the flow plate from the deposited dielectric material; and
depositing another material to form a second layer on the flow plate.

5. The method of claim 4, wherein the second layer comprises an electrically conductive layer.

6. The method of claim 1, further comprising:
depositing the material on other flow plates of the fuel cell stack.

7. The method of claim 1, wherein the depositing comprises:
flowing an electrocoating material through the fuel cell stack.

8. The method of claim 1, wherein the depositing comprises:
flowing an electrocoating material through coolant passageways of the fuel cell stack.

9. The method of claim 1, wherein the applying the charge comprises:
applying a potential to the flow plate.

10. A fuel cell stack comprising:
at least one flow plate;
a dielectric material bonded to said at least one flow plate; and
a second material deposited on said at least one flow plate.

11. The fuel cell stack of claim 10, wherein the material comprises an electrocoating material.

12. The fuel cell stack of claim 10, wherein the material lines coolant passageways of the fuel cell stack.

13. The fuel cell stack of claim 10, wherein the second material forms an electrically conductive layer.

14. A system comprising:
a fuel cell stack; and
a subsystem to apply a charge to the fuel cell stack and communicate a material through the fuel cell stack to deposit the material on at least part of the fuel cell stack in response to the applied charge.

15. The system of claim 14, wherein the deposited material electrically insulates a coolant passageway of the stack from a coolant.

16. The system of claim 14, further comprising:
a circuit to establish a first potential on the flow plates and a second different potential on the material to cause the material to deposit on said at least a part of the fuel cell stack.

17. The system of claim 16, wherein the circuit comprises a voltage source.

18. The system of claim 14, wherein the material comprises an electrocoating material.

19. A method comprising:
coating coolant passageways of a fuel cell stack to insulate the fuel cell stack from a coolant; and
assembling the fuel cell stack before performing the coating.

20. The method of claim 19, wherein the coating comprises:
depositing an electrocoating material.

21. The method of claim 19, further comprising:
circulating the coolant through the passageways.

22. The method of claim 19, wherein flow plates form at least part of the fuel cell stack, the method further comprising:
using flow channels of the flow plates to form at least one fuel cell.

23. A fuel cell stack comprising:
at least one flow plate;
a first material electrically deposited on the flow plate;
a second material deposited on said at least one flow plate; and
wherein one of the first material and the second material forms an electrically conductive and the other one of the first material and the second material forms a dielectric layer.

24. The fuel cell stack of claim 23, wherein at least one of the first and second materials comprises an electrocoating material.

25. The fuel cell stack of claim 23, wherein the first material lines coolant passageways of the fuel cell stack.

26. A method comprising:
adhering a coating to coolant passageway surfaces of a fuel cell stack to insulate the fuel cell stack from a coolant; and
assembling the fuel cell stack before performing the adhering.

27. The method of claim 26, wherein the adhering comprises:
depositing the coating on the coolant passageway surfaces.

28. The method of claim 27, wherein the adhering comprises charging flow plates of the fuel cell stack.

29. The method of claim 26, further comprising:
performing the adhering prior to assembling the fuel cell stack.

30. The method of claim 26, wherein the adhering comprises:
depositing an electrocoating material.

31. A method comprising:
depositing a material on a surface of a passageway of a fuel cell stack, the depositing including communicating a flow through the passageway of the fuel cell stack.

32. The method of claim 31, further comprising:
depositing the material in response to an electric charge applied to the fuel cell stack.

33. The method of claim 31, wherein the material comprises a dielectric material.

34. A method comprising:
communicating a flow through a passageway of a fuel cell stack to deposit a material on a surface of the passageway; and
depositing the material in response to an electric charge applied to the fuel cell stack.

* * * * *